United States Patent [19]
Knepler

[11] Patent Number: 6,139,888
[45] Date of Patent: Oct. 31, 2000

[54] BREWER TIMER ADJUSTMENT CONTROL

[75] Inventor: John T. Knepler, Springfield, Ill.

[73] Assignee: Bunn-O-Matic Corporation, Springfield, Ill.

[21] Appl. No.: 09/250,073

[22] Filed: Feb. 12, 1999

[51] Int. Cl.[7] ............................. G01N 33/02; A47J 31/00
[52] U.S. Cl. ........................... 426/231; 426/433; 99/283; 99/299
[58] Field of Search .................................... 426/433, 432, 426/231; 99/283, 282, 280, 299

[56] References Cited

U.S. PATENT DOCUMENTS

| | | | |
|---|---|---|---|
| 4,143,589 | 3/1979 | Weber | 99/289 |
| 4,328,539 | 5/1982 | Heeger | 364/144 |
| 4,979,641 | 12/1990 | Turner | 222/25 |
| 5,072,660 | 12/1991 | Helbling | 99/280 |
| 5,111,969 | 5/1992 | Knepler | 222/54 |
| 5,186,399 | 2/1993 | Knepler et al. | 241/34 |
| 5,200,221 | 4/1993 | Knepler | 426/231 |
| 5,285,717 | 2/1994 | Knepler | 99/282 |
| 5,375,508 | 12/1994 | Knepler et al. | 99/280 |
| 5,417,145 | 5/1995 | Joseph, Jr. et al. | 99/280 |
| 5,662,995 | 9/1997 | Joseph, Jr. et al. | 426/432 |

*Primary Examiner*—Milton Cano
*Assistant Examiner*—Sherry A. Dauerman
*Attorney, Agent, or Firm*—Trexler, Bushnell, Giangiorgi & Blackstone, Ltd.

[57] ABSTRACT

A digital timer and method for controlling a length of a brewing cycle during which time a brewer brews a beverage. The digital timer includes a controller having an initial brew time stored therein. A switch is in communication with the controller, and the controller is configured to add to and/or subtract from the initial brew time when the switch is actuated. The method includes steps of providing a digital timer including a controller having an initial brew time stored therein, providing a switch in communication with the controller, and actuating the switch, where the controller is configured to add to and/or subtract from the initial brew time when the switch is actuated.

11 Claims, 6 Drawing Sheets

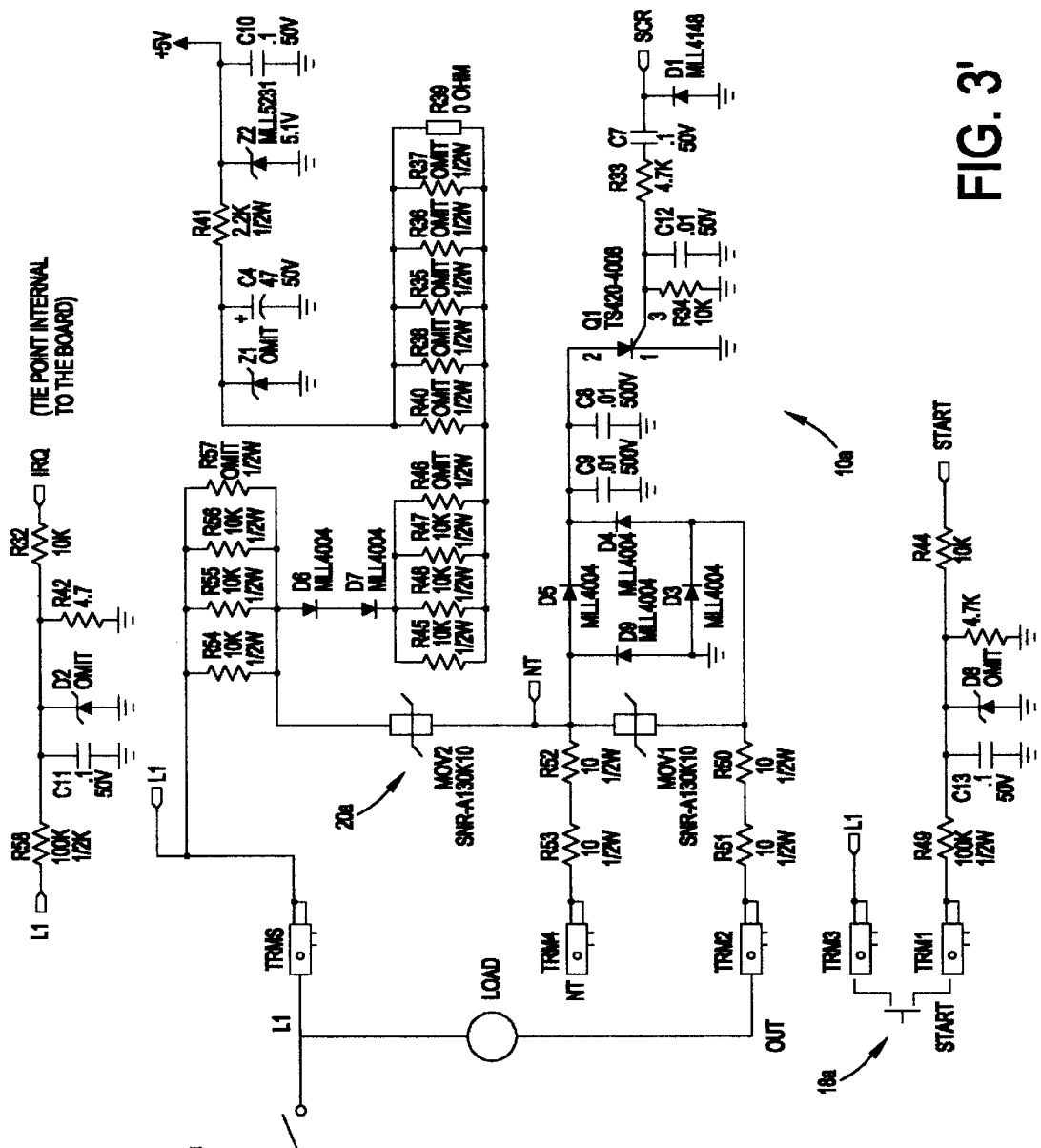

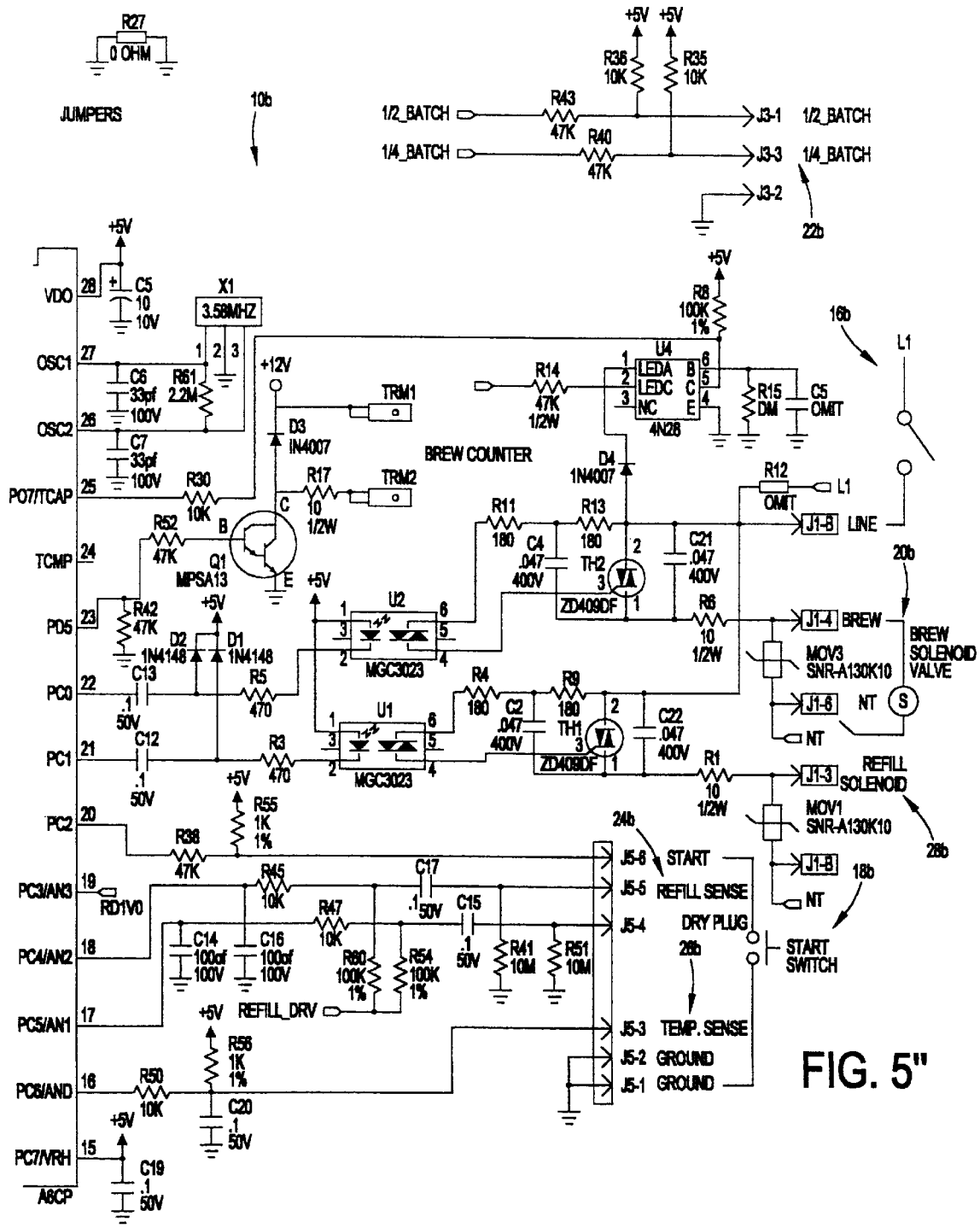

BREWER TIMER ADJUSTMENT CONTROL

BACKGROUND

The present invention relates generally to apparatuses and methods for controlling a length of a brewing cycle during which time a brewer brews a beverage. The present invention more specifically relates to an apparatus and method for controlling a length of a brewing cycle during which time a brewer brews a beverage, where an initial brew time which is stored in a controller can be adjusted relatively easily.

Some automatic brewers which brew hot beverages, such as coffee or tea, provide that the length of a brewing cycle can be programmed into the brewer so that each time the brewer performs a brewing cycle, generally the same volume of beverage is brewed.

For example, some automatic brewers provide a controller which generally controls the brewing operation and the length of the brewing cycle. Additionally, a warmer switch, a brew button and a run/program switch are provided on the brewer. To initially set the length of the brewing cycle of the brewer, a user switches on the warmer switch causing a warmer in the brewer to turn on, then switches the run/program switch from a "run" setting to a "program" setting. Then, the user presses the brew button to begin brewing, and after allowing the brewing to continue until the desired amount of beverage has been brewed by the brewer, the user turns off the warmer switch or presses the brew button a second time. The controller programs the brewing cycle to be the length of time between the beginning of the brewing and the switching off of the warmer switch or the pressing of the brew button a second time by the user.

Subsequently, should the user wish to initiate a brewing cycle of the same length of time, the user switches the warmer switch on, switches the run/program switch from the "program" setting to the "run" setting and presses the brew button.

Should the user wish to adjust the length of the brewing cycle which has been previously programmed into the brewer, the user may repeat the entire above-described process, i.e. switches the warmer switch on, switches the run/program switch to a "program" setting, presses the brew button, and then either switches the warmer switch off or presses the brew button a second time.

Alternatively, on some automatic brewers, the user may turn an analog knob on the brewer to set the length of the brewing cycle. Then, after the brewer completes the brewing cycle, the user may adjust the setting of the analog knob depending on whether or not the previous setting had resulted in the desired volume of beverage being brewed. Using the analog knob on the brewer to adjust the brewing cycle often results in much trial and error where the user first sets the knob, and then waits to see if the setting provides the desired volume of beverage. If not, the user adjusts the knob before starting another brewing cycle.

Therefore, while one method of adjusting the brewing cycle requires a user to repeat the entire process of programming the length of brewing cycle into the brewer, the other method may require a user to go through much trial and error. In brewers which have multiple batch settings, the user may have to repeat either process with regard to more than one brewing cycle setting of the brewer.

OBJECTS AND SUMMARY

A general object of the present invention may be to provide an apparatus and method for controlling a length of a brewing cycle during which time a brewer brews a beverage, where the brewing cycle can be adjusted relatively easily.

Another object of the present invention may be to provide an apparatus and method for controlling a length of a brewing cycle during which time a brewer brews a beverage, where the brewing cycle can be easily adjusted by, for example, pressing a single button on the brewer.

In accordance with these and other objects, the present invention envisions a digital timer for controlling a length of a brewing cycle during which time a brewer brews a beverage, where the length of the brewing cycle can be adjusted relatively easily. The digital timer includes a controller having an initial brew time stored therein, and a switch in communication with the controller. The controller is configured to add a pre-determined time increment to and/or subtract a predetermined time increment from the initial brew time when the switch is actuated.

The present invention also envisions a method which includes steps of providing a digital timer including a controller having an initial brew time stored therein, and providing a switch in communication with the controller. When the switch is actuated, the controller adds a pre-determined time increment to or subtracts a predetermined time increment from the initial brew time.

BRIEF DESCRIPTION OF THE DRAWINGS

The present invention and the advantages thereof will become more apparent upon consideration of the following detailed description when taken in conjunction with the accompanying drawings of which.

DESCRIPTION

Figure 1:
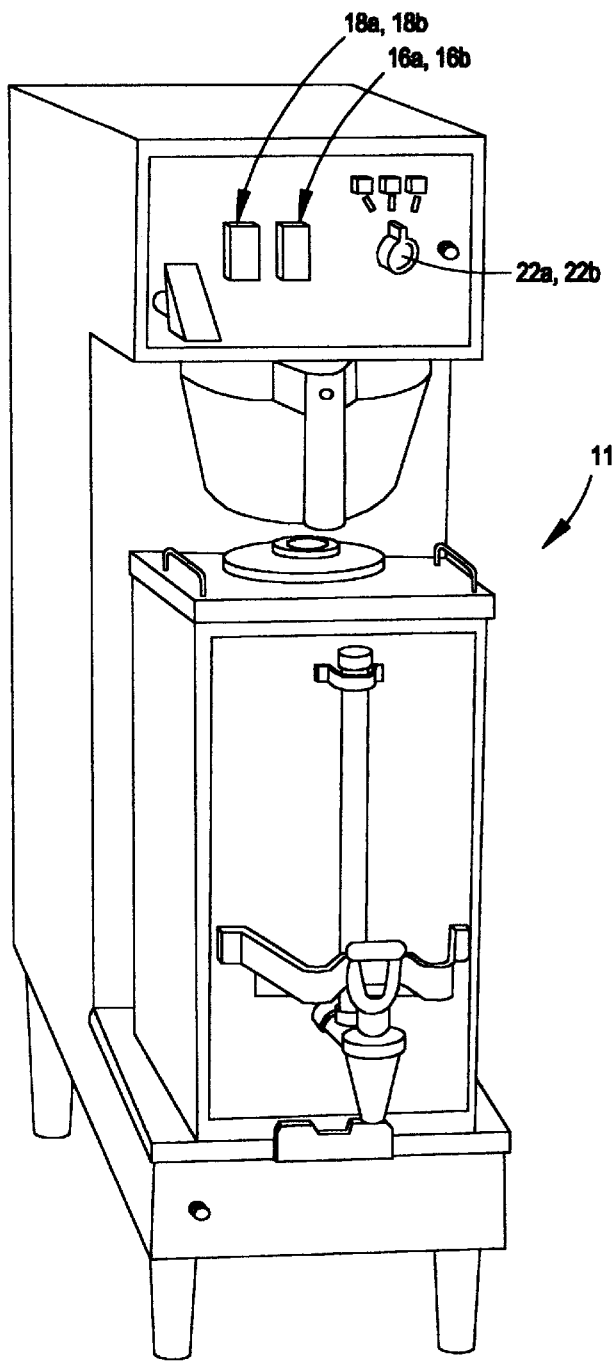
FIG. 1 is a perspective view of a beverage brewer.
Figure 2:
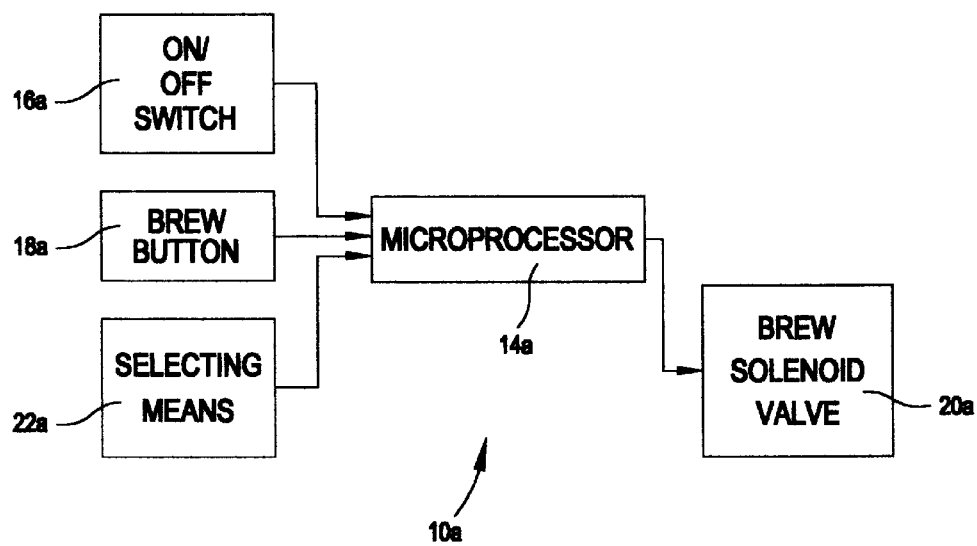
FIG. 2 is a block diagram of a digital timer which is in accordance with an embodiment of the present invention.
Figure 4:
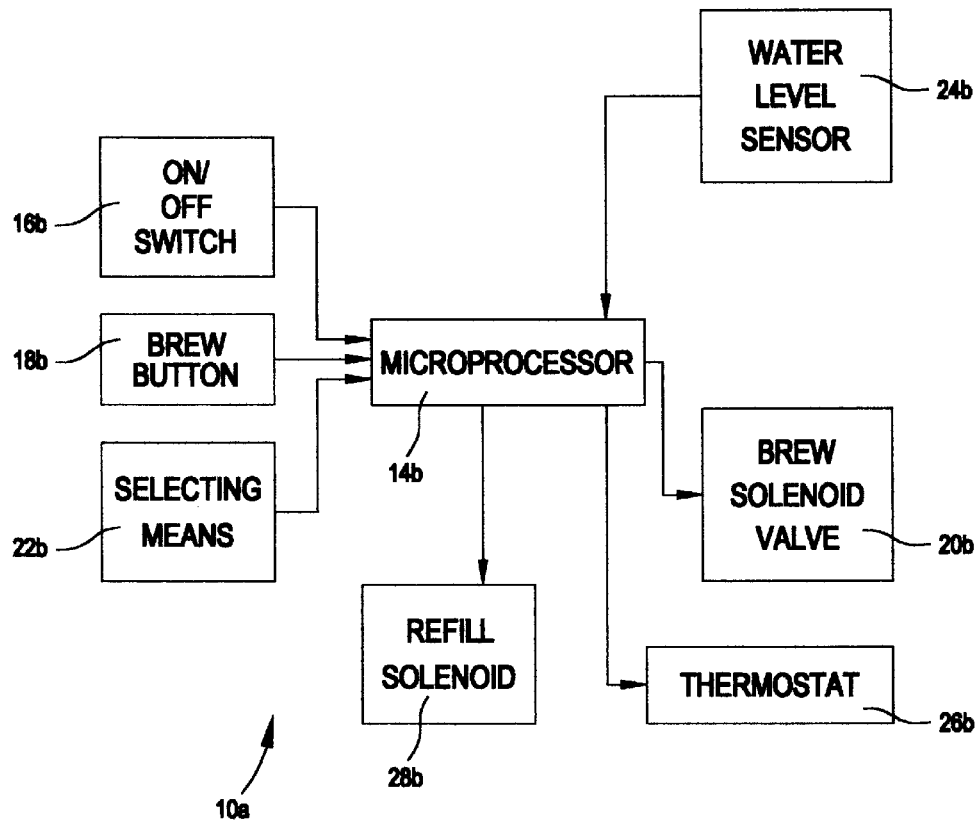
FIG. 4 is a block diagram of a combination controller which is in accordance with another embodiment of the present invention.
Figure 3:
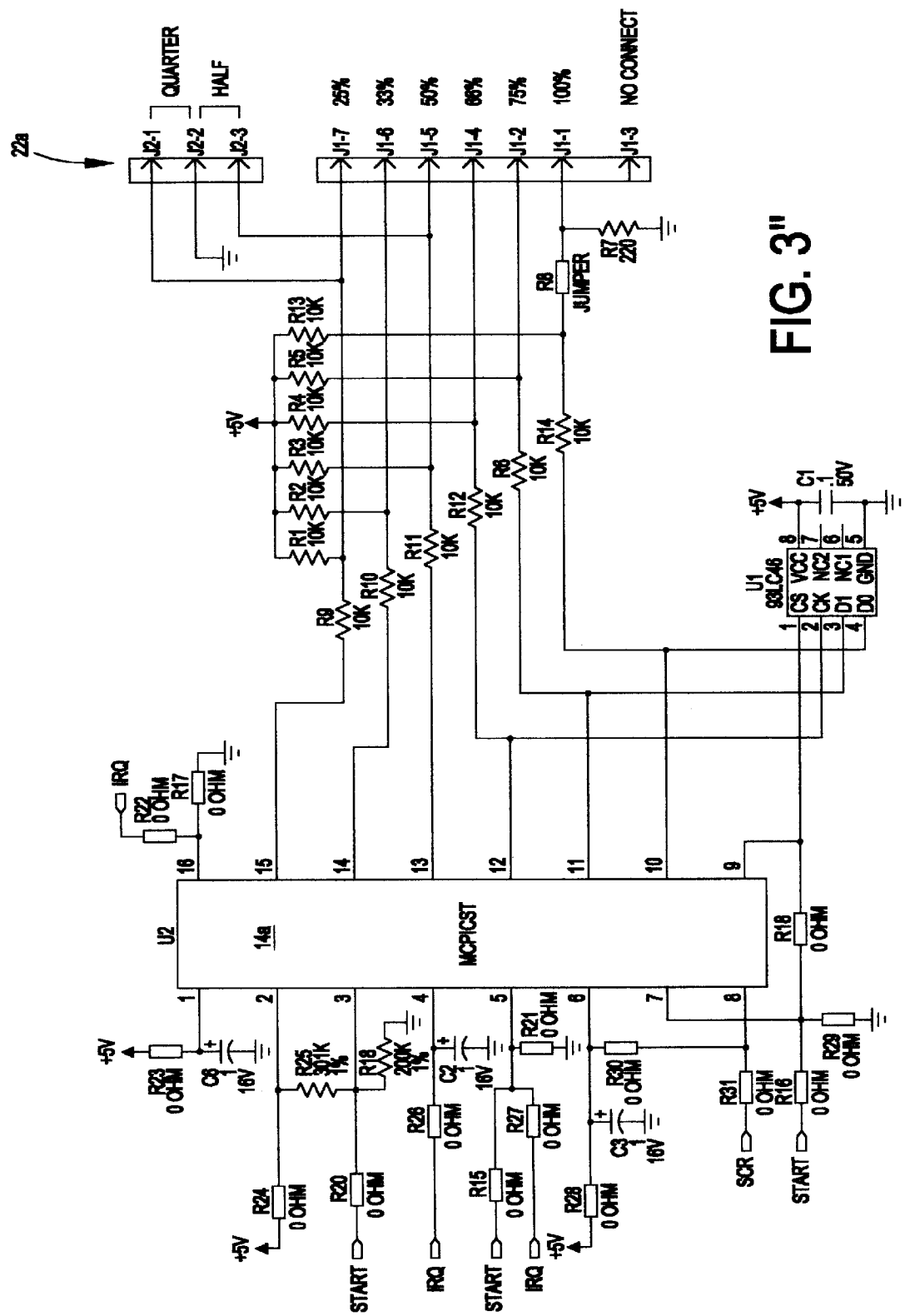
FIG. 3 (FIGS. 3' and 3" together) is a circuit diagram of the digital timer illustrated in FIG. 2.
Figure 5:
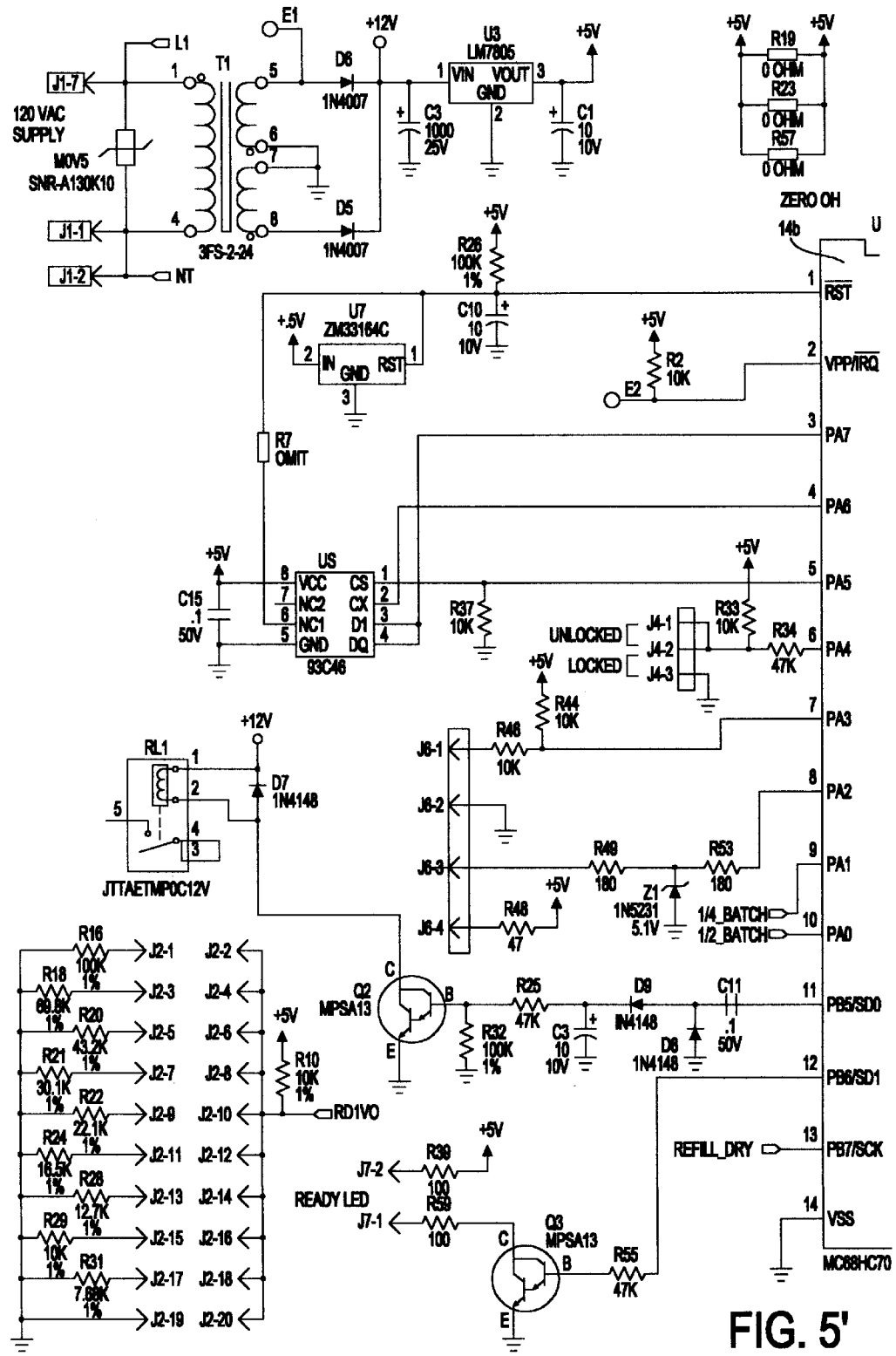
FIG. 5 (FIGS. 5' and 5" together) is a circuit diagram of the combination controller illustrated in FIG. 4.

FIGS. 2–3 and 4–5 illustrate a digital timer 10a and a combination controller 10b, respectively, each of which can be used to control a beverage brewer, such as the beverage brewer 11 illustrated in FIG. 1, which brews a beverage, such as coffee or tea. Each is in accordance with a different embodiment of the present invention. Specifically, FIGS. 2 and 3 illustrate a digital timer 10a which controls the length of a brewing cycle of the beverage brewer, during which time the beverage brewer brews a beverage. FIGS. 4 and 5 illustrate a combination controller 10b, which is also digital, and which controls not only the length of the brewing cycle, but also some additional functions such as a water level and a thermostat in the beverage brewer. Because the combination controller 10b illustrated in FIGS. 4 and 5 controls the length of the brewing cycle, the combination controller 10b, like the digital timer 10a illustrated in FIGS. 2 and 3, is also effectively a digital timer.

Both the digital timer 10a illustrated in FIGS. 2 and 3 and the combination controller 10b illustrated in FIGS. 4 and 5 provide that the length of a brewing cycle can be programmed into the digital timer 10a or combination controller 10b, respectively, so that the beverage brewer produces generally the same quantity of brewed beverage each time the beverage brewer performs a brewing operation (or produces generally the same quantity of beverage each time the beverage brewer performs a brewing operation for a particular batch setting).

Both the digital timer 10a and the combination controller 10b also provide that the length of the brewing cycle, after it has been programmed, can be easily adjusted. In fact, each provides that an adjustment to the length of the brewing cycle can be effected at the push of a single button. This convenience is an improvement over many timers and methods which have been previously utilized in connection with beverage brewers.

As illustrated in FIGS. 2–5, both the digital timer 10a and combination controller 10b preferably include a microprocessor 14a, 14b or some other type of controller. The microprocessor 14a of the digital timer 10a may be an MCPICST microprocessor, and the microprocessor 14b of the combination controller 10b may be an MC68HC705PA6CP microprocessor.

In both the digital timer 10a and the combination controller 10b, the microprocessor 14a, 14b is connected to an on/off switch or button 16a, 16b and to a brew button 18a, 18b. The on/off switch 16a, 16b and brew button 18a, 18b are preferably located on the face of the respective beverage brewer, such as is shown in FIG. 1. However, they may be located inside a door (not shown) of the respective beverage brewer, or at some other location on the beverage brewer.

Although not specifically shown, a warming device may be provided in the beverage brewer, where the warming device heats a liquid, such as water, in the beverage brewer during a brewing operation. In this case, the on/off switch 16a, 16b is preferably effectively a warmer button which is not only in communication with the microprocessor 14a, 14b, but is also in communication with the warming device. Preferably, the warming device becomes activated when the on/off switch 16a, 16b is actuated (i.e. is turned "on").

The microprocessors 14a, 14b of both the digital timer 10a and the combination controller 10b are connected to a brew solenoid valve 20a, 20b. The microprocessors 10a, 10b of both the digital timer 10a and the combination controller 10b control the respective brew solenoid valve 20a, 20b to control dispensing of brewed beverage by the respective beverage brewer. Preferably, the microprocessors 14a, 14b of both the digital timer 10a and combination controller 10b are configured to initiate a brewing cycle when the brew button 18a, 18b is pressed. This will be described more fully later herein. By controlling the brew solenoid valve 20a, 20b, each microprocessor 14a, 14b controls a length of a brewing cycle, which determines what volume of beverage is brewed and dispensed by the beverage brewer in a brewing operation.

Other devices besides a brew solenoid valve 20a, 20b can be connected to the microprocessors 14a, 14b of the digital timer 10a and the combination controller 10b, respectively. For example, selecting means 22a, 22b such as buttons or switches may be connected to the microprocessors 14a, 14b and may be provided on the face, or inside a front door, of the beverage brewer for selecting the size of the batch to be brewed by the beverage brewer. As illustrated in FIG. 3 in connection with the digital timer 10a, the selecting means 22a may provide that a user can select between a quarter (25%) batch, a third (33%) batch, a half (50%) batch, a two-thirds (66%) batch, a three-quarters (75%) batch and a full (100%) batch (preferably the default selection). Alternatively, as illustrated in FIG. 5 in connection with the combination controller 10b, the selecting means 22b may provide that a user can select only between a quarter (25%) batch, a half (50%) batch and a full (100%) batch (preferably the default selection). Still further, all selections may be independently settable times rather than fixed percentages. Preferably, the selecting means 22a, 22b is provided on the face of the respective beverage brewer, such as is shown in FIG. 1. However, the selecting means 22a, 22b may be located instead inside a door (not shown) of the respective beverage brewer, or at some other location on the beverage brewer.

As discussed above, the combination controller 10b preferably controls a water level and a thermostat in the beverage brewer. Therefore, preferably the microprocessor 14b of the combination controller 10b is connected to a water level sensor 24b and to a thermostat 26b. As illustrated in FIGS. 4 and 5, the microprocessor 14b of the combination controller 10b can also be connected to a refill solenoid 28b. Preferably, the beverage brewer is connected to a water line (not shown), and the microprocessor 14b of the combination controller 10b operates the refill solenoid 28b depending on what the water level sensor 24b senses, in order to refill the beverage brewer with water from the water line at the appropriate time.

Although not specifically illustrated in FIGS. 2–5, the microprocessors 14a, 14b of the digital timer 10a and combination controller 10b can also be connected to additional or alternative buttons and/or switches, and can be connected to additional or alternative devices which the microprocessors 14a, 14b control and/or receive information from in connection with operation of the beverage brewer.

Both the digital timer 10a and the combination controller 10b provide that the length of a brewing cycle can be programmed into the microprocessors 14a, 14b, so that the beverage brewer produces generally the same quantity of brewed beverage each time the beverage brewer performs a brewing operation. Additionally, both the digital timer 10a and the combination controller 10b provide that the length of a brewing cycle, after it has been programmed into the microprocessors 14a, 14b, can be easily adjusted. In fact, preferably each provides that an adjustment to the length of the brewing cycle can be effected at the push of a single button, such as at the push of the brew button 18a, 18b.

One example of how the microprocessors 14a, 14b of the digital timer 10a and the combination controller 10b can be configured to effect the programming of a length of a brewing cycle into the microprocessors 14a, 14b, and the subsequent adjustment of the length of the brewing cycle will now be described.

Preferably, the length of a brewing cycle can be programmed or stored into the microprocessors 14a, 14b by actuating the respective on/off switch 16a, 16b (i.e. turning the switch "on"). The microprocessors 14a, 14b may be configured such that after the respective on/off switch 16a, 16b is actuated, the brew button 18a, 18b may be pressed and held down until the brew solenoid valve 20a, 20b clicks on and off three times, which may take approximately five seconds, thereby effectively indicating to the microprocessor 14a, 14b that one wants to set or adjust the length of a brewing cycle. After the beverage brewer dispenses the desired amount of water or brewed beverage, one may de-actuate the on/off switch 16a, 16b (i.e. turn the switch "off"). The microprocessor 14a, 14b is then set to produce this desired amount of brewed beverage during a brewing cycle. This process may be repeated for different batch settings, or the microprocessor 14a, 14b may be configured such that a single programmed setting carries over into the other batch settings. In other words, the microprocessor 14a, 14b may be configured to use the full batch setting, which has been set by the user, to automatically set the other batch settings.

The microprocessors 14a, 14b may be configured such that to increase the length of the brewing cycle which has been programmed into the microprocessors 14a, 14b, one first actuates the on/off switch 16a, 16b (i.e. turns the switch "on"), and then presses and holds the brew button 18a, 18b until the brew solenoid valve 20a, 20b clicks on and off three times, which may take approximately five seconds, thereby effectively indicating to the microprocessor 14a, 14b that one wants to set or adjust the length of a brewing cycle. Then, one may momentarily press the brew button 18a, 18b a number of times to increase the length of the brewing cycle, where the microprocessors 14a, 14b are configured such that the length of the brewing cycle increases a pre-determined length of time (i.e. a pre-determined time increment) for each time the brew button 18a, 18b is pressed. For example, the microprocessors 14a, 14b may be configured such that each time the brew button 18a, 18b is momentarily pressed, two seconds are added to the length of the brewing cycle, where each two second block may yield about one ounce of brewed beverage.

Preferably, after the user adjusts the brew time by pressing the brew button 18a, 18b a desired number of times, the microprocessor 14a, 14b senses that the adjustment is complete due to the fact that the brew button 18a, 18b has not been pushed for a certain period of time, such as for the last twenty seconds. Once the microprocessor 14a, 14b detects that the user has completed the adjustment, the microprocessor 14a, 14b stores the new value so that subsequent brewing cycles are performed in accordance therewith.

Alternatively, the microprocessors 14a, 14b may be configured such that after one presses the brew button 18a, 18b the desired number of times to add time to the length of the brewing cycle, one presses and holds the brew button 18a, 18b until the brew solenoid valve 20a, 20b clicks on and off three times, which may take approximately five seconds, thereby effectively indicating to the microprocessor 14a, 14b that one is finished adjusting the length of the brewing cycle. Preferably, the new adjusted brewing cycle length is stored in the microprocessor 14a, 14b such that subsequent brewing cycles are performed in accordance therewith.

The microprocessors 14a, 14b may be configured such that to decrease the length of the brewing cycle which has been programmed into the microprocessors 14, 14b, one first actuates the on/off switch 16a, 16b (i.e. turns the switch "on"), and then momentarily presses the brew button 18a, 18b a number of times to decrease the length of the brewing cycle, where the microprocessors 14a, 14b are configured such that the length of the brewing cycle decreases a pre-determined length of time for each time the brew button 18a, 18b is pressed. For example, the microprocessors 14a, 14b may be configured such that each time the brew button 18a, 18b is momentarily pressed, two seconds are subtracted from the length of the brewing cycle, where each two second block may yield about one ounce of brewed beverage.

Preferably, after the user adjusts the brew time by pressing the brew button 18a, 18b a desired number of times, the microprocessor 14a, 14b senses that the adjustment is complete due to the fact that the brew button 18a, 18b has not been pushed for a certain period of time, such as for the last twenty seconds. Once the microprocessor 14a, 14b detects that the user has completed the adjustment, the microprocessor 14a, 14b stores the new value so that subsequent brewing cycles are performed in accordance therewith.

Alternatively, the microprocessors 14a, 14b may be configured such that after one presses the brew button 18a, 18b the desired number of times to subtract time from the length of the brewing cycle, one presses and holds the brew button 18a, 18b until the brew solenoid valve 20a, 20b clicks on and off three times, which may take approximately five seconds, thereby effectively indicating to the microprocessor 14a, 14b that one is finished adjusting the length of the brewing cycle. Preferably, the new adjusted brewing cycle length is stored in the microprocessor 14a, 14b such that subsequent brewing cycles are performed in accordance therewith.

After adjusting the length of the brewing cycle, one may allow the beverage brewer to finish dispensing the brewed beverage to determine if the new setting is correct. If not, one may repeat the above-described adjusting process. However, typically one will not need to repeat the process to obtain the desired setting because each momentary press of the brew button 18a, 18b adjusts the length of the brewing cycle for a pre-determined length of time.

The adjusting process may also be repeated for different batch settings, or the microprocessors 14a, 14b may be configured such that the microprocessors 14a, 14b automatically carry an adjustment to one batch setting over into the other batch settings. For example, adjusting the desired volume for a full batch setting may cause the microprocessors 14a, 14b to automatically adjust the other batch settings depending on the adjustment made by the user.

While a specific example of how the microprocessors 14a, 14b may be configured to provide for the setting and adjusting of a length of a brewing cycle is described hereinabove, several other configurations are possible.

While embodiments of the present invention are shown and described, it is envisioned that those skilled in the art may devise various modifications without departing from the spirit and scope of the appended claims.

What is claimed is:

1. A digital timer for controlling a length of a brewing cycle during which time a brewer brews a beverage, said digital timer comprising: a controller having an initial brew time stored therein; a switch in communication with said controller, said controller configured to at least one of add a pre-determined time increment to and subtract a pre-determined time increment from said initial brew time when said switch is actuated, said controller configured to direct said brewer to initiate a brewing cycle when said switch is initially actuated, and configured to one of add a pre-determined time increment to said initial brew time stored in said controller each time said switch is momentarily actuated after being initially actuated to initiate said brewing cycle and subtract said pre-determined time increment from said initial brew time stored in said controller each time said switch is momentarily actuated after being initially actuated to initiate said brewing cycle, wherein the brew time is adjustable while the brewer is brewing the beverage.

2. A digital timer as recited in claim 1, connected to said brewer and configured to cause said brewer to brew said beverage for a length of time equal to said initial brew time stored in said controller plus or minus a length of time corresponding to how many times said switch is actuated, said controller configured to at least one of add to or subtract from said initial brew time each time said switch is actuated.

3. A digital timer as recited in claim 1, further comprising a solenoid connected to said switch and to said brewer, said solenoid switchable when said switch is actuated.

4. A digital timer as recited in claim 1, said controller configured to add a pre-determined time increment to said initial brew time stored in said controller each time said switch is actuated.

5. A digital timer as recited in claim 1, said controller configured to subtract a predetermined time increment from said initial brew time stored in said controller each time said switch is actuated.

6. A digital timer as recited in claim 1, said controller configured to at least one of subtract a predetermined time increment from said initial brew time stored in said controller each time said switch is momentarily actuated before a brewing cycle is initiated and add said pre-determined time increment to said initial brew time stored in said controller each time said switch is momentarily actuated before said brewing cycle is initiated, and configured to direct said brewer to initiate said brewing cycle when said switch is subsequently actuated for more than a pre-determined length of time.

7. A digital timer as recited in claim 1, said controller configured to control a water level of said brewer.

8. A digital timer as recited in claim 1, said controller configured to control a temperature of said brewer.

9. A method of controlling a length of a brewing cycle during which time a brewer brews a beverage, said method comprising: providing a digital timer including a controller having an initial brew time stored therein; providing a switch in communication with said controller; actuating said switch to have the brewer initiate a brewing cycle; and actuating said switch again while the brewer brews the beverage to adjust the brew time, said controller configured to at least one of add a pre-determined time increment to and subtract a pre-determined time increment from said initial brew time when said switch is actuated while the brewer is brewing the beverage.

10. A method as recited in claim 9, further comprising actuating said switch a number of times depending on how much time is desired to be added to or subtracted from said initial brew time which is stored in said controller, said controller configured to at least one of add a pre-determined time increment to said initial brew time each time said switch is actuated and subtract said predetermined time increment from said initial brew time each time said switch is actuated.

11. A method as recited in claim 10, said method further comprising providing a warmer and providing a second switch in communication with said warmer, wherein said warmer activates when said second switch is actuated; actuating said second switch; and after actuating said second switch, actuating said switch to cause said controller to initiate a brewing cycle; and after actuating said switch to initiate said brewing cycle and while the brewer is brewing the beverage, actuating said switch a number of times corresponding to how much time is desired to be added to or subtracted from said initial brew time which is stored in said controller.

* * * * *